(12) United States Patent
Liu

(10) Patent No.: US 11,409,258 B2
(45) Date of Patent: Aug. 9, 2022

(54) INFORMATION PROCESSING DEVICE AND INFORMATION PROCESSING METHOD

(71) Applicant: FANUC CORPORATION, Minamitsuru-gun (JP)

(72) Inventor: Sichen Liu, Yamanashi-ken (JP)

(73) Assignee: FANUC CORPORATION, Yamanashi-Ken (JP)

( * ) Notice: Subject to any disclaimer, the term of this patent is extended or adjusted under 35 U.S.C. 154(b) by 152 days.

(21) Appl. No.: 16/799,460

(22) Filed: Feb. 24, 2020

(65) Prior Publication Data
US 2020/0278656 A1 Sep. 3, 2020

(30) Foreign Application Priority Data
Feb. 28, 2019 (JP) .............................. JP2019-035598

(51) Int. Cl.
*G05B 19/402* (2006.01)
(52) U.S. Cl.
CPC .. *G05B 19/402* (2013.01); *G05B 2219/50063* (2013.01)
(58) Field of Classification Search
CPC ................ G05B 19/402; G05B 19/409; G05B 2219/50063
See application file for complete search history.

(56) References Cited

U.S. PATENT DOCUMENTS

| 6,338,003 | B1 | 1/2002 | Kamiguchi et al. |
| 9,409,272 | B2 | 8/2016 | Tezuka et al. |
| 2010/0063615 | A1 | 3/2010 | Mori et al. |
| 2010/0119146 | A1 | 5/2010 | Inazumi |
| 2011/0128367 | A1 | 6/2011 | Yoshioka et al. |
| 2011/0232118 | A1* | 9/2011 | Hon ......................... G01B 5/20 33/559 |
| 2012/0163930 | A1 | 6/2012 | Jeyaraman et al. |

(Continued)

FOREIGN PATENT DOCUMENTS

| JP | S63-3311 A | 1/1988 |
| JP | H08-106317 A | 4/1996 |

(Continued)

OTHER PUBLICATIONS

Japanese Office Action, dated May 11, 2021, in Japanese Application No. 2019-635598 and English Translation thereof.

(Continued)

*Primary Examiner* — Kidest Bahta
(74) *Attorney, Agent, or Firm* — McGinn I.P. Law Group, PLLC.

(57) ABSTRACT

An information processing device is connected to a measurement device provided in the vicinity of a machine tool for machining a workpiece using a tool and a numerical control device configured to control the machine tool. The information processing device includes: a display unit configured to display information; a first acquisition unit configured to acquire, from the measurement device, measurement information measured by the measurement device; a second acquisition unit configured to acquire, from the numerical control device, state information indicating a state of the machine tool; and a display control unit configured to cause the display unit to display the measurement information and the state information.

20 Claims, 5 Drawing Sheets

(56) References Cited

U.S. PATENT DOCUMENTS

| | | | |
|---|---|---|---|
| 2012/0296463 A1 | 11/2012 | Rivers et al. | |
| 2013/0218322 A1 | 8/2013 | Carli | |
| 2014/0233839 A1 | 8/2014 | Morita et al. | |
| 2015/0229835 A1 | 8/2015 | Takahashi | |
| 2016/0001445 A1 | 1/2016 | Setsuda et al. | |
| 2016/0320772 A1* | 11/2016 | Ono | G05B 19/4068 |
| 2016/0334777 A1 | 11/2016 | Sato | |
| 2017/0308063 A1* | 10/2017 | Kawai | B23Q 17/00 |
| 2018/0003485 A1* | 1/2018 | Naruse | G05B 19/00 |
| 2018/0107192 A1 | 4/2018 | Endo et al. | |
| 2018/0304202 A1* | 10/2018 | Kariveti | C02F 1/42 |

FOREIGN PATENT DOCUMENTS

| | | |
|---|---|---|
| JP | H09-244728 A | 9/1997 |
| JP | 2009-034738 A | 2/2009 |
| JP | 2010-105063 A | 5/2010 |
| JP | 2011-154436 A | 8/2011 |
| JP | 2012-093262 A | 5/2012 |
| JP | 2016-128182 A | 7/2016 |
| WO | WO 2016/181450 A1 | 11/2016 |
| WO | WO 2017/029381 A1 | 2/2017 |

OTHER PUBLICATIONS

United States Office Action dated Feb. 1, 2022, in co-pending U.S. Appl. No. 16/799,514.
United States Office Action dated May 31, 2022, in co-pending U.S. Appl. No. 16/799,514.

* cited by examiner

INFORMATION PROCESSING DEVICE AND INFORMATION PROCESSING METHOD

CROSS-REFERENCE TO RELATED APPLICATION

This application is based upon and claims the benefit of priority from Japanese Patent Application No. 2019-035598 filed on Feb. 28, 2019, the contents of which are incorporated herein by reference.

BACKGROUND OF THE INVENTION

Field of the Invention

The present invention relates to an information processing device connected to a measurement device provided in the vicinity of a machine tool for machining a workpiece with a tool and a numerical control device for controlling the machine tool, and also relates to an information processing method.

Description of the Related Art

A numerical control device has a display unit for displaying state information indicating the state of a machine tool. For example, Japanese Laid-Open Patent Publication No. 08-106317 discloses a numerical control device that displays on a display screen the present position of a tool in a machine coordinate system, on the basis of rotational positions of servomotors etc.

On the other hand, commercially available measurement devices include cameras with display units, field balancers used for balance control of a rotary body like a spindle, probes used to measure inclination etc. of the workpiece, and so on. Such commercially available measurement devices are generally equipped with a display unit for displaying the measured results.

SUMMARY OF THE INVENTION

However, when using commercially available measurement equipment, the operator checks the measurement information on the display unit of the measurement device and also checks the state information on the display unit of the numerical control device. That is, the operator has to check the measurement information and the state information on separate display screens. As such, in order to check the measurement information and state information more conveniently, the operator may be forced to, for example, change the position of installation of at least one of the measurement device and numerical control device. This will reduce work efficiency.

Accordingly, an object of the present invention is to provide an information processing device and information processing method that improves work efficiency.

A first aspect of the present invention is characterized by an information processing device that is connected to a measurement device and a numerical control device, the measurement device being provided in a vicinity of a machine tool configured to machine a workpiece using a tool, the numerical control device being configured to control the machine tool. The information processing device includes: a display unit configured to display information; a first acquisition unit configured to acquire, from the measurement device, measurement information measured by the measurement device; a second acquisition unit configured to acquire, from the numerical control device, state information indicating a state of the machine tool; and a display control unit configured to cause the display unit to display the measurement information and the state information.

A second aspect of the present invention is characterized by an information processing method for an information processing device that is connected to a measurement device and a numerical control device, the measurement device being provided in a vicinity of a machine tool configured to machine a workpiece using a tool, the numerical control device being configured to control the machine tool. The information processing method includes: an acquisition step of acquiring, from the measurement device, measurement information measured by the measurement device, and acquiring, from the numerical control device, state information indicating a state of the machine tool; and a display step of causing a display unit to display the measurement information and the state information.

According to the present invention, the operator can check both the measurement information and state information on a single display screen. Accordingly, the operator is not forced to change the position of installation of at least one of the measurement device and numerical control device for ease of checking both the measurement information and state information. This improves work efficiency.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The present invention will now be described in detail while referring to the accompanying drawings in conjunction with preferred embodiments.

Embodiment

Figure 1:
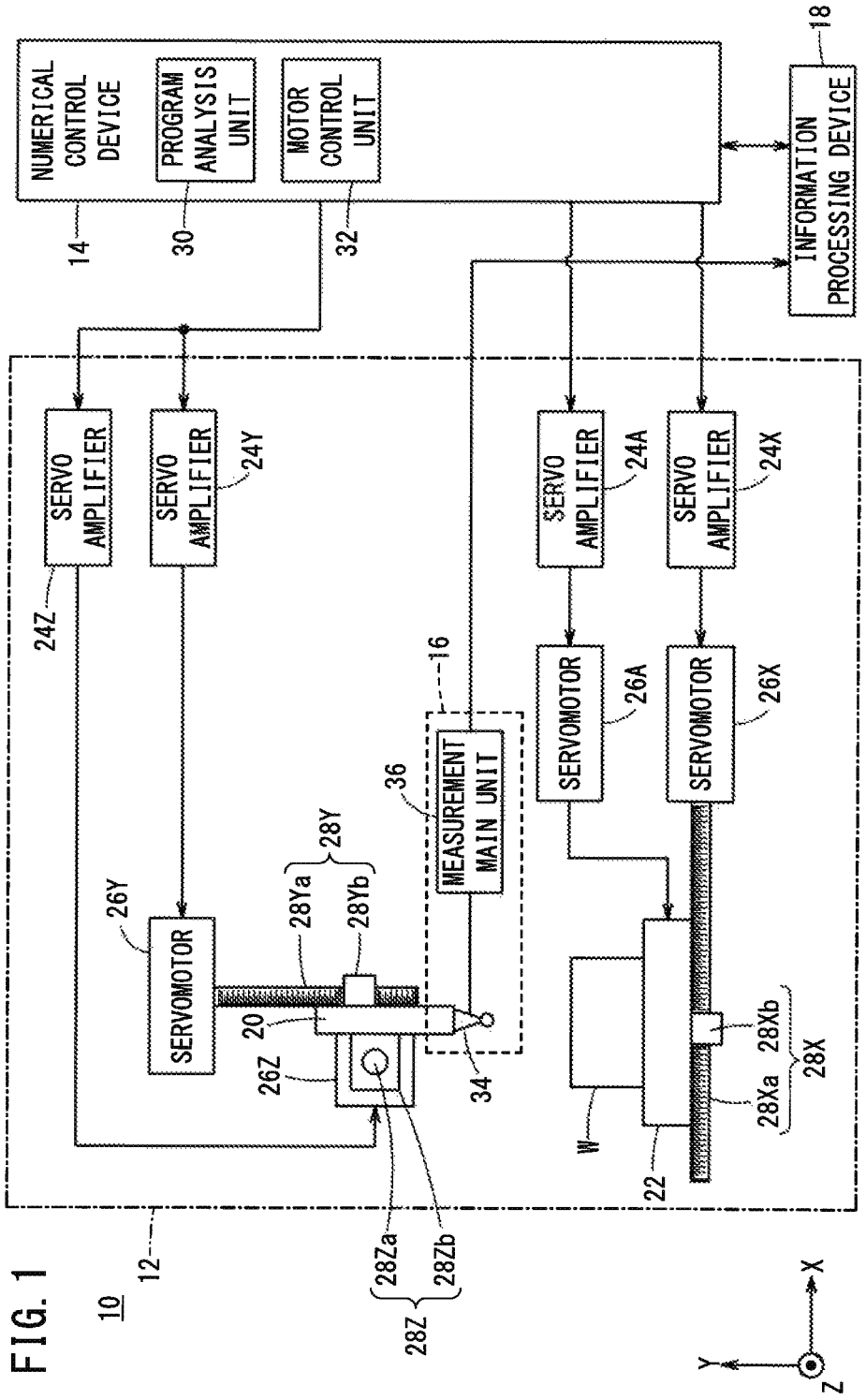
FIG. 1 is a schematic diagram illustrating a machining system according to an embodiment.

FIG. 1 is a schematic diagram illustrating a machining system 10 according to an embodiment. The machining system 10 includes a machine tool 12, a numerical control device 14, a measurement device 16, and an information processing device 18.

The machine tool 12 is configured to machine a workpiece W (an object to be machined) using a tool. The machine tool 12 includes a fixing stand 20 to which a tool or the like is attached and a table 22 to which the workpiece W or the like is attached. In this embodiment, it is assumed that a probe 34 of the measurement device 16 is attached to the fixing stand 20.

The machine tool 12 further includes servo amplifiers 24 (24Y, 24Z, 24X, 24A), servomotors 26 (26Y, 26Z, 26X, 26A), and power conversion and transmission mechanisms 28 (28Y, 28Z, 28X).

The servomotor 26Y is a motor for axially moving the fixing stand 20 in a Y-axis direction and the servomotor 26Z is a motor for axially moving the fixing stand 20 in a Z-axis direction. The servomotor 26X is a motor for axially moving the table 22 in an X-axis direction, and the servomotor 26A is a motor for changing the inclination of the table 22. It is assumed that the Y-axis direction is an axial direction for approaching or separating away from the workpiece W, and the X-axis direction and the Z-axis direction are orthogonal to each other in a plane that is orthogonal to the Y-axis direction.

The rotational force of the servomotor 26Y is transmitted to the fixing stand 20 via the power conversion and transmission mechanism 28Y. The power conversion and transmission mechanism 28Y is configured to convert the rotational force of the servomotor 26Y into linear motion in the Y-axis direction. Accordingly, the fixing stand 20 moves axially in the Y-axis direction as the servomotor 26Y rotates. The power conversion and transmission mechanism 28Y includes a ball screw 28Ya that is connected to a rotary shaft of the servomotor 26Y extending in the Y-axis direction and a nut 28Yb that is screw-engaged with the ball screw 28Ya and connected to the fixing stand 20.

The rotational force of the servomotor 26Z is transmitted to the fixing stand 20 via the power conversion and transmission mechanism 28Z. The power conversion and transmission mechanism 28Z is configured to convert the rotational force of the servomotor 26Z into linear motion in the Z-axis direction. Accordingly, the fixing stand 20 moves axially in the Z-axis direction as the servomotor 26Z rotates. The power conversion and transmission mechanism 28Z includes a ball screw 28Za that is connected to a rotary shaft of the servomotor 26Z extending in the Z-axis direction and a nut 28Zb that is screw-engaged with the ball screw 28Za and connected to the fixing stand 20.

The rotational force of the servomotor 26X is transmitted to the table 22 via the power conversion and transmission mechanism 28X. The power conversion and transmission mechanism 28X is configured to convert the rotational force of the servomotor 26X into linear motion in the X-axis direction. Accordingly, the table 22 moves axially in the X-axis direction as the servomotor 26X rotates. The power conversion and transmission mechanism 28X includes a ball screw 28Xa connected to a rotary shaft of the servomotor 26X extending in the X-axis direction and a nut 28Xb that is screw-engaged with the ball screw 28Xa and connected to the table 22.

The rotational force of the servomotor 26A is transmitted to the table 22 via a power conversion and transmission mechanism (not shown). The power conversion and transmission mechanism is configured to convert the rotational force of the servomotor 26A into movement in a direction for changing inclination of the table 22. Accordingly, inclination of the table 22 changes as the servomotor 26A rotates.

The numerical control device 14 is configured to control the machine tool 12. The numerical control device 14 includes a program analysis unit 30 and a motor control unit 32. The program analysis unit 30 analyzes a program and outputs the analyzed results to the motor control unit 32. On the basis of the results of analysis of the program, the motor control unit 32 controls the servomotors 26Y, 26Z, 26X through the servo amplifiers 24Y, 24Z, 24X. The fixing stand 20 thus makes axial movement in the Y-axis direction and Z-axis direction and the table 22 makes axial movement in the X-axis direction.

When the operator operates the information processing device 18 to effect an axial feed operation (Y-axis feed operation, Z-axis feed operation, X-axis feed operation), then the information processing device 18 provides the motor control unit 32 with a feed position (coordinate information) corresponding to the axial feed operation. In this case, the motor control unit 32 controls the servomotors 26Y, 26Z, 26X through the servo amplifiers 24Y, 24Z, 24X so as to achieve the feed position. Consequently, the fixing stand 20 moves axially in the Y-axis direction when the operator performs a Y-axis feed operation, the fixing stand 20 moves axially in the Z-axis direction when the operator performs a Z-axis feed operation, and the table 22 moves axially in the X-axis direction when the operator performs an X-axis feed operation.

Further, when a compensation position (coordinate information) for compensating the inclination of the table 22 is provided from the information processing device 18 to the motor control unit 32, the motor control unit 32 controls the servomotor 26A through the servo amplifier 24A so as to achieve the compensation position. Consequently, the table 22 moves so that the inclination of the table 22 changes.

The measurement device 16 is installed in the vicinity of the machine tool 12 and includes the probe 34 and a measurement main unit 36. The probe 34 is a rod-shaped probe for measuring a distance to the workpiece W, and is attached to the fixing stand 20 with its tip directed toward the workpiece W. When the probe 34 is properly attached to the fixing stand 20, the longitudinal direction of the probe 34 has a relationship with the X-, Y-, and Z-axis direction in which the longitudinal direction is parallel to the Y-axis direction and orthogonal to the X-axis direction and Z-axis direction. This relationship includes tolerance that occurs due to fixing of the probe 34 to the fixing stand 20, installation of the axes (X axis, Y axis, Z axis), etc.

The measurement main unit 36 measures a relative distance between the probe 34 and the workpiece W. In this embodiment, the measurement main unit 36 measures the relative distance between the probe 34 and the workpiece W by detecting a contact pressure of the probe 34 in contact with the workpiece W and converting the detected contact pressure into the distance to the workpiece W.

Figure 2:
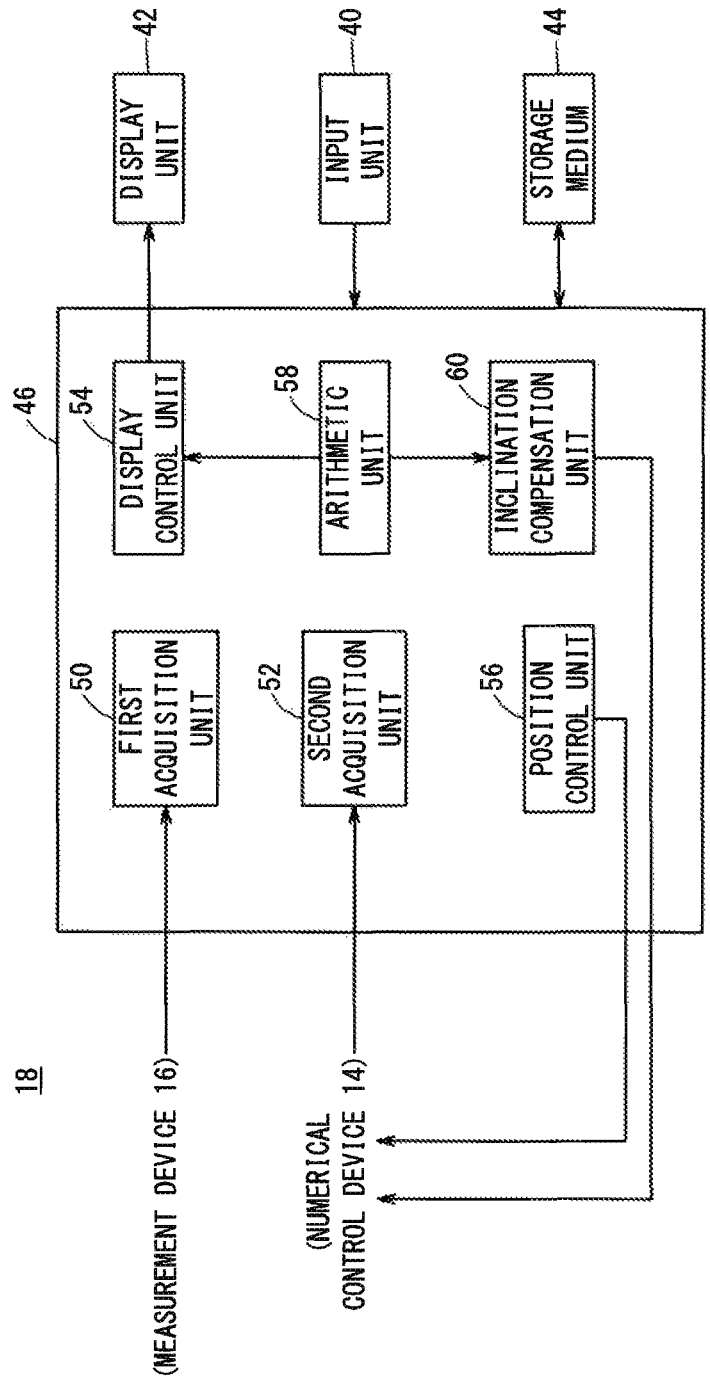
FIG. 2 is a schematic diagram illustrating the configuration of an information processing device.

The information processing device 18 is configured to process various information. The information processing device 18 is connected to the numerical control device 14 and the measurement device 16 so as to send and receive various information to and from the numerical control device 14 and the measurement device 16. FIG. 2 is a schematic diagram illustrating the configuration of the information processing device 18. The information processing device 18 includes an input unit 40, a display unit 42, a storage medium 44, and a signal processing unit 46.

The input unit 40 is an operation unit that allows the operator to enter commands etc. The input unit 40 includes a numeric keypad used for entering numerical data, a keyboard, a touch panel, a volume knob, and the like. The touch panel may be provided on a display screen of the display unit 42.

The display unit 42 is configured to display information, and the storage medium 44 is a medium that stores information. Specifically, the display unit 42 can be a liquid crystal display, and the storage medium 44 can be a hard disk, for example.

The signal processing unit 46 is connected to the input unit 40, display unit 42, and storage medium 44, and includes a processor such as CPU (Central Processing Unit) or MPU (Micro Processing Unit). The processor executes a basic program stored in the storage medium 44 so that the signal processing unit 46 functions as a first acquisition unit 50, a second acquisition unit 52, a display control unit 54, a position control unit 56, an arithmetic unit 58, and an inclination compensation unit 60.

The first acquisition unit 50 is configured to acquire from the measurement device 16 measurement information measured by the measurement device 16. In this embodiment, the first acquisition unit 50 acquires the distance measured by the measurement device 16, from the measurement device 16 at given intervals. On acquiring the measurement information (distance), the first acquisition unit 50 stores the acquired measurement information in the storage medium 44.

The second acquisition unit 52 is configured to acquire from the numerical control device 14 state information indicating a state of the machine tool 12. The state information includes, for example, a position (machine coordinates) of the tool or probe 34 attached to the fixing stand 20, amount of axial feed and axial feed rate, machining time of the workpiece W, operating time of the machine tool 12, rotational speed of the spindle, etc. In this embodiment, the second acquisition unit 52 acquires at least the position of the probe 34 from the numerical control device 14 at given intervals. On acquiring the state information (the position of the probe 34), the second acquisition unit 52 stores the acquired state information in the storage medium 44.

The display control unit 54 is configured to control the display unit 42. The display control unit 54 causes the display unit 42 to display the measurement information and the state information stored in the storage medium 44. This allows the operator to check both the measurement information and state information on one display screen.

Figure 3:
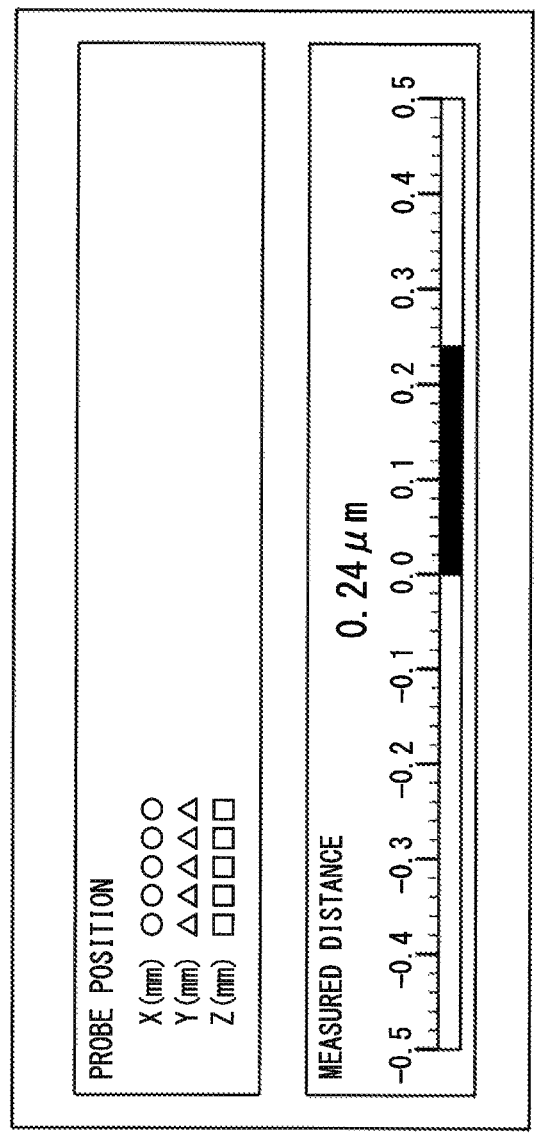
FIG. 3 is a diagram showing an example of how to display.

In this embodiment, as shown in FIG. 3, for example, the display control unit 54 causes the distance (measured distance) and the position of the probe 34 to be displayed on the same screen. This enables the operator to perform an axial feed operation so as to locate the probe 34 at a desired position with respect to the workpiece W, while checking the absolute position of the probe 34 and the relative distance of the probe 34 with respect to the workpiece W on one display screen. FIG. 3 shows an example in which the amount of change in the distance is displayed with a numerical value and by means of a gauge.

When an axial feed operation (Y-axis feed operation, Z-axis feed operation, X-axis feed operation) is performed by the operator using the input unit 40, the position control unit 56 controls the machine tool 12 so as to perform an axial movement corresponding to that axial feed operation.

That is, the position control unit 56 generates a feed position (coordinate information) corresponding to the axial feed operation made by the operator and outputs the generated feed position to the motor control unit 32. Then, the motor control unit 32 controls the servomotors 26Y, 26Z, 26X so as to achieve the feed position, so that the fixing stand 20 or the table 22 axially moves in accordance with the axial feed operation.

Further, when the operator performs a measurement operation using the input unit 40, the position control unit 56 controls the machine tool 12 so as to displace the relative position of the probe 34 with respect to the workpiece W along the X axis or Z axis.

That is, the position control unit 56 generates a measurement program for displacing the relative position of the probe 34 with respect to the workpiece W under measurement conditions specified by the operator. In this embodiment, it is assumed that the specified measurement conditions include a moving direction and a moving distance from the position of the probe 34 at the time when the probe 34 has been positioned to contact the workpiece W by an axial feed operation made by the operator (at the start of measurement). The moving direction is at least one of the X-axis direction and Z-axis direction, and it is assumed in this embodiment that the Z-axis direction is specified.

After generating the measurement program, the position control unit 56 outputs the generated measurement program to the motor control unit 32. Then, the motor control unit 32 controls the servomotor 26Z on the basis of the measurement program, whereby the fixing stand 20 moves from the position determined by the axial feed operation, in the Z-axis direction, by the moving distance that is specified by the operator. As a result, the relative position of the probe 34 attached to the fixing stand 20 changes along the Z axis, with respect to the workpiece W. At this time, axial movement of the fixing stand 20 in the Y-axis direction is stopped and therefore the probe 34 attached to the fixing stand 20 is immobile in the Y-axis direction.

The arithmetic unit 58 calculates the amount of change in the distance measured by the measurement device 16, on the basis of the distances that are stored in the storage medium 44 at given intervals.

That is, the arithmetic unit 58 sets the distance measured at the start of measurement as a reference, and calculates a difference (the amount of change) between the distance set as the reference and each distance measured at given intervals while the relative position of the probe 34 with respect to the workpiece W is being changed along the Z axis. Alternatively, among the distances measured at given intervals while the relative position of the probe 34 with respect to the workpiece W is being changed along the Z axis, the arithmetic unit 58 may set, as a reference, one of two distances obtained as the result of preceding and subsequent measurements, and calculate the difference (the amount of change) between the reference and the other of the two distances.

After having calculated the amount of change in the distance to the workpiece W, the arithmetic unit 58 outputs the calculated amount of change to the display control unit 54. Consequently, as shown in FIG. 3, the display control unit 54 displays the amount of change in the distance to the workpiece W. The operator can thus grasp whether the workpiece W is inclined.

The arithmetic unit 58 further calculates an inclination θ of the workpiece W on the basis of the distances and the positions of the probe 34 that are stored in the storage medium 44 at given intervals.

Figure 4:
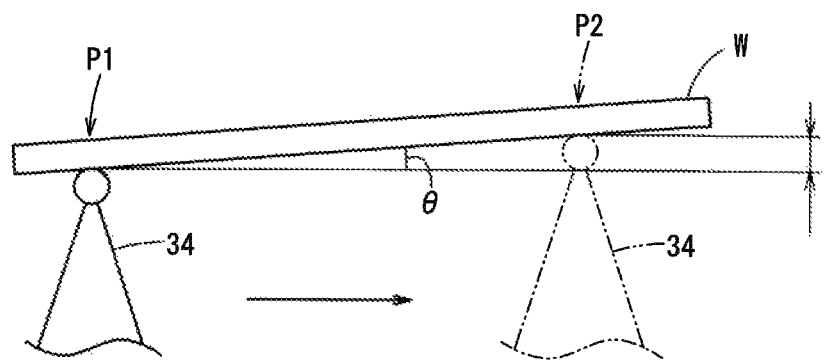
FIG. 4 is a conceptual diagram illustrating displacement of a relative position of a probe with respect to a workpiece.

That is, as shown in FIG. 4, the arithmetic unit 58 calculates the inclination θ of the workpiece W on the basis of the distance measured when the probe 34, which is displaced by the position control unit 56 with respect to the workpiece W, is at a first relative position P1, and the distance measured when the probe 34 is at a second relative position P2. More specifically, the arithmetic unit 58 calculates the inclination θ on the basis of the difference between the distance at the first relative position P1 and the distance at the second relative position P2, and the difference (the amount of movement) between the first relative position P1 and the second relative position P2.

In FIG. 4, the distance measured by converting the contact pressure of the probe 34 at the first relative position P1 and the distance measured by converting the contact pressure of the probe 34 at the second relative position P2 differ from each other, and the positions of the first relative position P1 and the second relative position P2 also differ from each other. Accordingly, the inclination θ of the workpiece W is larger than zero. Though not shown graphically, the inclination θ of the workpiece W is zero if the distances and positions at the first relative position P1 and the second relative position P2 are the same. That is, no inclination θ of the workpiece W is present.

The inclination compensation unit 60 controls the machine tool 12 so as to make smaller the inclination θ of the workpiece W calculated by the arithmetic unit 58. That is, when the inclination θ of the workpiece W calculated by the arithmetic unit 58 is larger than zero, the inclination compensation unit 60 generates a compensation position (coordinate information) at which the inclination θ becomes zero, for example, and outputs the generated feed position to the motor control unit 32. The motor control unit 32 then controls the servomotor 26A so as to achieve the compensation position, so that the table 22 moves in such a manner that the inclination θ of the table 22 becomes zero. As a result, the inclination θ of the workpiece W attached to the table 22 is adjusted to be perpendicular to the Y axis.

Figure 5:
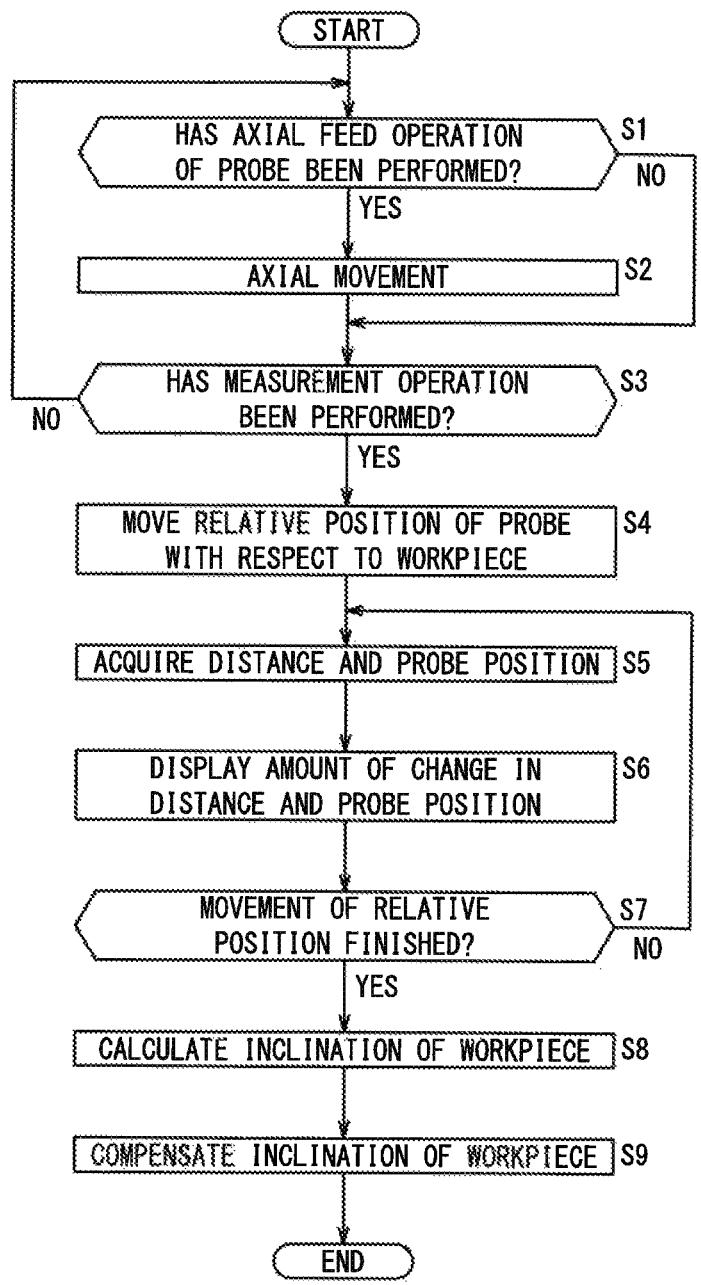
FIG. 5 is a flowchart showing the flow of an inclination compensation mode.

Next, an inclination compensation mode of the information processing device 18 will be described. FIG. 5 is a flowchart showing the flow of the inclination compensation mode.

When the mode for compensating the inclination θ of the workpiece W is set, the arithmetic unit 58 determines at step S1 whether an axial feed operation has been performed by the operator operating the input unit 40. At this time, the display control unit 54 provides control to display the distance acquired from the measurement device 16 by the first acquisition unit 50 and the position of the probe 34 acquired from the numerical control device 14 by the second acquisition unit 52. The operator can thus perform an axial feed operation in such a manner that the probe 34 is located at a desired position with respect to the workpiece W.

Now, in this embodiment, it is assumed that the axial feed operation is performed such that the tip of the probe 34 comes in contact at a desired position on the workpiece W, as a preparation for measuring the relative distance between the probe 34 and the workpiece W.

When the axial feed operation has been performed, the arithmetic unit 58 moves to step S2, in which the arithmetic unit 58 generates the feed position (coordinate information) corresponding to the axial feed operation and outputs it to the motor control unit 32, to thereby axially move the fixing stand 20 to which the probe 34 is attached. The process then moves to step S3. On the other hand, when no axial feed operation is performed at step S1, the arithmetic unit 58 moves to step S3.

At step S3, the position control unit 56 determines whether the operator has operated the input unit 40 to perform a measurement operation. If no measurement operation is performed, the position control unit 56 returns to step S1. On the other hand, when a measurement operation has been performed, the position control unit 56 moves to step S4.

At step S4, the position control unit 56 axially moves the fixing stand 20 to which the probe 34 is attached, in such a manner that the relative position of the probe 34 with respect to the workpiece W moves along the Z axis. That is, the position control unit 56 generates a measurement program for displacing the relative position of the probe 34 with respect to the workpiece W under measurement conditions specified by the operator, and then outputs the generated measurement program to the numerical control device 14. The process then moves to step S5.

At step S5, the first acquisition unit 50 starts acquiring the distance from the measurement device 16 at given intervals and stores the acquired distances in the storage medium 44. The second acquisition unit 52 starts acquiring the position of the probe 34 from the numerical control device 14 at given intervals and stores the acquired positions of the probe 34 in the storage medium 44. The process moves to step S6 when the distances and the relative positions of the probe 34 have been stored.

At step S6, on the basis of the distances stored in the storage medium 44, the arithmetic unit 58 calculates the amount of change in the distance obtained while the relative position of the probe 34 was being displaced with respect to the workpiece W at step S4. Further, the display control unit 54 causes the display unit 42 to display the amount of change in the distance calculated by the arithmetic unit 58 and the position of the probe 34 at the time of the calculation. The process then moves to step S7.

At step S7, on the basis of the positions of the probe 34 stored in the storage medium 44, the position control unit 56 determines whether the fixing stand 20 has been axially moved until the relative position of the probe 34 with respect to the workpiece W has been displaced by the moving distance specified as the measurement condition. When the fixing stand 20 has not been axially moved by the moving distance specified as the measurement condition, the position control unit 56 returns to step S5.

On the other hand, when the fixing stand 20 has been axially moved by the moving distance specified as the measurement condition, the position control unit 56 stops the axial movement of the fixing stand 20. In this case, the first acquisition unit 50 stops the acquisition of the distance and the second acquisition unit 52 stops the acquisition of the position of the probe 34. The process moves to step S8 when the stopping processing has ended.

At step S8, the arithmetic unit 58 calculates the inclination θ of the workpiece W on the basis of the distances and the positions of the probe 34 stored in the storage medium 44, and the process then moves to step S9 to determine whether the calculated inclination θ is zero or not.

If the inclination θ is zero, the inclination compensation mode is put to an end. On the other hand, if the inclination θ is larger than zero, the inclination compensation unit 60 generates a compensation position (coordinate information) at which the inclination θ becomes zero, for example, and outputs the compensation position to the motor control unit 32, whereby the inclination θ of the workpiece W attached to the table 22 is adjusted such that the inclination θ becomes parallel to the movement axis. The inclination compensation mode is thus ended. In this embodiment, the inclination θ is compensated (adjusted) such that it becomes parallel to the Z axis.

[Modifications]

The above-described embodiment can be modified in the following ways.

(First Modification)

In the embodiment above, the display control unit 54 does not cause the inclination θ calculated by the arithmetic unit 58 to be displayed. However, the inclination θ may be displayed on the display unit 42. The display control unit 54 may cause the inclination θ calculated by the arithmetic unit 58 to be displayed on the same screen together with the distance measured by the measurement device 16 and the position of the probe 34, or may cause the inclination θ calculated by the arithmetic unit 58 to be displayed on a different screen from a screen displaying the distance and the position of the probe 34. Further, in the above embodiment, the display control unit 54 displays the amount of change in the distance measured by the measurement device 16. However, it may display the distances measured by the measurement device 16 together with this amount of change.

(Second Modification)

In the embodiment above, the position control unit 56 displaces the relative position of the probe 34 in contact with the workpiece W along the Z-axis direction. At this time, the arithmetic unit 58 calculates the inclination θ on the basis of the difference between the distance measured when the probe 34, which is displaced along the Z axis, is at the first relative position P1 and the distance measured when the probe 34 is at the second relative position P2, and the difference (the amount of movement) between the first relative position P1 and the second relative position P2.

On the other hand, the position control unit 56 may be configured to displace the relative position of the probe 34 along the Y axis, from a given first start position to a position at which it comes in contact with the workpiece W, and also displace the relative position of the probe 34 along the Y axis from a second start position, which is shifted from the first start position in the Z-axis direction, to a position at which it comes in contact with the workpiece W. In this case, the arithmetic unit 58 may calculate the inclination θ of the workpiece W on the basis of the difference (the amount of movement) between the first start position and the second start position, and the difference between the distance from the first start position to the position of the contact with the workpiece W and the distance from the second start position to the position of the contact with the workpiece W.

(Third Modification)

In the embodiment above, the relative position of the probe 34 with respect to the workpiece W is displaced along the Z axis by a moving distance that is specified by the operator. However, if the workpiece W is smaller than the moving distance specified by the operator, then the measurement device 16 becomes unable to measure the distance in the course of the measurement. Hence, if the measurement device 16 has become unable to measure, the information processing device 18 may control the numerical control device 14 to stop the machine tool 12 and may calculate the inclination θ of the workpiece W using distances that had been measured before the measurement became impossible.

More specifically, when the first acquisition unit 50 has become unable to acquire the measurement information (distance) from the measurement device 16, the position control unit 56 outputs a stop command to the motor control unit 32 to stop the relative displacement of the probe 34 with respect to the workpiece W. Further, in this case, the arithmetic unit 58 calculates the inclination θ of the workpiece W as mentioned above on the basis of the distances and the positions of the probe 34 that were stored in the storage medium 44 before the first acquisition unit 50 became unable to acquire.

(Fourth Modification)

In the embodiment above, the arithmetic unit 58 calculates the inclination θ of the workpiece W on the basis of the distances that are measured when the probe 34, which is displaced with respect to the workpiece W, is at the two relative positions (first relative position P1, second relative position P2). However, the arithmetic unit 58 may calculate the inclination θ of the workpiece W on the basis of the distances that are measured when the probe 34 is at more than two relative positions.

(Fifth Modification)

In the embodiment above, the inclination of the table 22 in the Z-axis direction or X axis direction is changed. However, the inclination of the table 22 in the Y-axis direction may be changed. In cases where the inclination of the table 22 in the Y-axis direction is changed, the inclination is changed by a servomotor different from the servomotor 26A.

(Sixth Modification)

In the embodiment above, the measurement device 16 measures the relative distance between the probe 34 and the workpiece W by converting the contact pressure of the probe 34 contacting the workpiece W into the distance to the workpiece W. However, the measurement device 16 may measure the relative distance between the probe 34 and the workpiece W by converting a time from transmission of light to the workpiece W until its reception, into the distance to the workpiece W. Furthermore, as the measurement device 16, a device that measures the distance by converting a parameter other than the contact pressure or the above time into the distance may be also used.

(Seventh Modification)

In the inclination compensation mode of the embodiment above, an operator causes the probe 34 to contact a desired position on the workpiece W by performing an axial feed operation, and the information processing device 18 calculates the inclination θ of the workpiece W from the contact position and compensates the inclination θ on the basis of the calculated result. However, the information processing device 18 may cause the probe 34 to contact a desired position on the workpiece W and calculate the inclination θ of the workpiece W from the contact position and compensate the inclination θ on the basis of the calculated result.

(Eighth Modification)

The above-described embodiment uses the power conversion and transmission mechanisms 28 including the servomotors 26, ball screws 28Xa, 28Ya, 28Za, and the nuts 28Xb, 28Yb, 28Zb in order to axially move the probe 34 or workpiece W. In the mechanisms for axially moving the probe 34 or workpiece W, the ball screws 28Xa, 28Ya, 28Za may be replaced by aerostatic lead screws.

Similarly, for the mechanisms for axially moving the probe 34 or workpiece W, the power conversion and transmission mechanisms 28 including the servomotors 26, ball screws 28Xa, 28Ya, 28Za, and the nuts 28Xb, 28Yb, 28Zb may be replaced by linear motors (motors) including static pressure bearings.

(Ninth Modification)

The first to eighth modifications may be arbitrarily combined within a range in which no inconsistencies occur therein.

Invention Obtained from Embodiments and Modifications

The invention graspable from the above-described embodiments and modifications will be recited below.

(First Invention)

A first invention provides the information processing device (18) connected to a measurement device (16) and a numerical control device (14), the measurement device being provided in the vicinity of a machine tool (12) configured to machine a workpiece (W) using a tool, the numerical control device (14) being configured to control the machine tool (12). The information processing device (18) includes: a display unit (42) configured to display information; a first acquisition unit (50) configured to acquire, from the measurement device (16), measurement information measured by the measurement device (16); a second acquisition unit (52) configured to acquire, from the numerical control device (14), state information indicating a state of the machine tool (12); and a display control unit (54) configured to cause the display unit (42) to display the measurement information and the state information.

The above configuration makes it possible for an operator to check both the measurement information and state information on a single display screen. Thus, the operator is not forced to change the position of installation of at least one of the measurement device (16) and the numerical control device (14) for ease of checking both the measurement information and state information. This improves work efficiency.

The measurement device (16) may include a probe (34) configured to measure a distance to the workpiece (W), and the display control unit (54) may cause the distance and a position of the probe (34) to be displayed. With this configuration, the operator can easily perform an axial feed operation to locate the probe (34) at a desired position with respect to the workpiece (W), while checking the absolute position of the probe (34) and the relative distance of the probe (34) with respect to the workpiece (W) on a single display screen.

The information processing device (18) may further include a position control unit (56) configured to control the machine tool (12) in such a manner that a relative position of the probe (34) with respect to the workpiece (W) is displaced along an axis extending in a direction perpendicular to a longitudinal direction of the probe (34), and the display control unit (54) may provide control to display the amount of change in the distance measured while control is being performed to displace the relative position of the probe (34) with respect to the workpiece (W). This enables the operator to grasp whether an inclination ($\theta$) of the workpiece (W) is present.

The information processing device (18) may further include: an arithmetic unit (58) configured to calculate an inclination ($\theta$) of the workpiece (W) based on the distance measured when the probe (34) being displaced by the position control unit (56) with respect to the workpiece (W) is at a first relative position (P1) and the distance measured when the probe (34) is at a second relative position (P2); and an inclination compensation unit (60) configured to control the machine tool (12) so as to make smaller the inclination ($\theta$) of the workpiece (W) calculated by the arithmetic unit (58). It is thus possible to automatically adjust the inclination ($\theta$) of the workpiece (W) without requiring the operator to perform an axial feed operation, and it is also possible to easily improve accuracy as compared to cases where the operator performs an axial feed operation.

The measurement device (16) may measure the distance by detecting a contact pressure of the probe (34) contacting the workpiece (W) and converting the detected contact pressure into the distance, and the position control unit (56) may control the machine tool (12) in such a manner that the relative position of the contacting probe (34) with respect to the workpiece (W) is displaced along the axis. It is thus possible to measure minute change in the distance in real time and to optionally change the first relative position (P1) and the second relative position (P2), so that the workpiece (W) can be easily measured even if it has irregularities.

(Second Invention)

A second invention provides an information processing method for an information processing device (18) that is connected to a measurement device (16) and a numerical control device (14), the measurement device being provided in the vicinity of a machine tool (12) configured to machine a workpiece (W) using a tool, the numerical control device (14) being configured to control the machine tool (12). The information processing method includes: an acquisition step (S5) of acquiring, from the measurement device (16), measurement information measured by the measurement device (16), and acquiring, from the numerical control device (14), state information indicating a state of the machine tool (12); and a display step (S6) of causing a display unit (42) to display the measurement information and the state information.

Owing thereto, an operator can check both the measurement information and state information on a single display screen. Thus, the operator is not forced to change the position of installation of at least one of the measurement device (16) and numerical control device (14) for ease of checking both the measurement information and state information. This improves work efficiency.

The acquisition step (S5) may acquire the measurement information from the measurement device (16) that includes a probe (34) configured to measure a distance to the workpiece (W), and the display step (S6) may cause the distance and a position of the probe (34) to be displayed. With this configuration, the operator can easily perform an axial feed operation to locate the probe (34) at a desired position with respect to the workpiece (W), while checking the absolute position of the probe (34) and the relative distance of the probe (34) with respect to the workpiece (W) on a single display screen.

The information processing method may further include a control step (S4) of controlling the machine tool (12) in such a manner that a relative position of the probe (34) with respect to the workpiece (W) is displaced along an axis extending in a direction perpendicular to a longitudinal direction of the probe (34), and the display step (S6) may display the amount of change in the distance measured while control is being performed to displace the relative position of the probe (34) with respect to the workpiece (W). This enables the operator to grasp whether an inclination ($\theta$) of the workpiece (W) is present.

The information processing method may further include: an arithmetic step (S8) of calculating an inclination ($\theta$) of the workpiece (W) based on the distance measured when the probe (34) being displaced in the control step (S4) with respect to the workpiece (W) is at a first relative position (P1) and the distance measured when the probe (34) is at a second relative position (P2); and an inclination compensation step (S9) of controlling the machine tool (12) so as to make the inclination ($\theta$) of the workpiece (W) smaller. It is thus possible to automatically adjust the inclination ($\theta$) of the workpiece (W) without requiring the operator to perform an axial feed operation, and it is also possible to easily improve accuracy as compared to cases where the operator performs an axial feed operation.

The acquisition step (S5) may acquire the distance measured by converting a contact pressure of the probe (34) contacting the workpiece (W) into the distance, and the control step (S4) may control the machine tool (12) in such a manner that the relative position of the contacting probe (34) with respect to the workpiece (W) is displaced along the axis. It is thus possible to measure minute change in the distance in real time and to optionally change the first relative position (P1) and the second relative position (P2), so that the workpiece (W) can be easily measured even if it has irregularities.

The present invention is not particularly limited to the embodiments described above, and various modifications are possible without departing from the essence and gist of the present invention.

What is claimed is:

1. An information processing device that is connected to a measurement device and a numerical control device, the measurement device being provided in a vicinity of a machine tool configured to machine a workpiece using a tool, the numerical control device being configured to control the machine tool, the information processing device comprising:
   a display unit configured to display information;
   a first acquisition unit configured to acquire, from the measurement device, measurement information indicating a positional relationship of the measurement device with respect to the workpiece as measured by the measurement device;
   a second acquisition unit configured to acquire, from the numerical control device, state information indicating a state of the machine tool; and
   a display control unit configured to cause the display unit to display the measurement information and the state information.

2. The information processing device according to claim 1, wherein:
   the measurement device includes a probe configured to measure a distance between the probe and the workpiece; and
   the display control unit causes the distance and a position of the probe to be displayed.

3. The information processing device according to claim 2, further comprising a position control unit configured to control the machine tool in a manner that a relative position of the probe with respect to the workpiece is displaced along an axis extending in a direction perpendicular to a longitudinal direction of the probe,
   wherein the display control unit provides control to display an amount of change in the distance measured while control is being performed to displace the relative position of the probe with respect to the workpiece.

4. The information processing device according to claim 3, further comprising:
   an arithmetic unit configured to calculate an inclination of the workpiece based on the distance measured when the probe being displaced by the position control unit with respect to the workpiece is at a first relative position and the distance measured when the probe is at a second relative position; and
   an inclination compensation unit configured to control the machine tool so as to reduce the inclination of the workpiece calculated by the arithmetic unit.

5. The information processing device according to claim 3,
   wherein the measurement device measures the distance by detecting a contact pressure of the probe contacting the workpiece and converting the detected contact pressure into the distance, and
   the position control unit controls the machine tool in a manner that the relative position of the contacting probe with respect to the workpiece is displaced along the axis.

6. The information processing device according to claim 4,
   wherein the measurement device measures the distance by detecting a contact pressure of the probe contacting the workpiece and converting the detected contact pressure into the distance, and
   the position control unit controls the machine tool in a manner that the relative position of the contacting probe with respect to the workpiece is displaced along the axis.

7. An information processing method for an information processing device that is connected to a measurement device and a numerical control device, the measurement device being provided in a vicinity of a machine tool configured to machine a workpiece using a tool, the numerical control device being configured to control the machine tool, the information processing method comprising:
   an acquisition step of acquiring, from the measurement device, measurement information indicating a positional relationship of the measurement device with respect to the workpiece as measured by the measurement device, and acquiring, from the numerical control device, state information indicating a state of the machine tool; and
   a display step of causing a display unit to display the measurement information and the state information.

8. The information processing method according to claim 7, wherein:
   the acquisition step acquires the measurement information from the measurement device that includes a probe configured to measure a distance between the probe and the workpiece; and
   the display step causes the distance and a position of the probe to be displayed.

9. The information processing method according to claim 8, further comprising a control step of controlling the machine tool in a manner that a relative position of the probe with respect to the workpiece is displaced along an axis extending in a direction perpendicular to a longitudinal direction of the probe,
   wherein the display step displays an amount of change in the distance measured while control is being performed to displace the relative position of the probe with respect to the workpiece.

10. The information processing method according to claim 9, further comprising:
    an arithmetic step of calculating an inclination of the workpiece based on the distance measured when the probe being displaced in the control step with respect to the workpiece is at a first relative position and the distance measured when the probe is at a second relative position; and
    an inclination compensation step of controlling the machine tool so as to reduce the inclination of the workpiece.

11. The information processing method according to claim 9,
    wherein the acquisition step acquires the distance measured by converting a contact pressure of the probe contacting the workpiece into the distance, and
    the control step controls the machine tool in a manner that the relative position of the contacting probe with respect to the workpiece is displaced along the axis.

12. The information processing method according to claim 10,
wherein the acquisition step acquires the distance measured by converting a contact pressure of the probe contacting the workpiece into the distance, and
the control step controls the machine tool in a manner that the relative position of the contacting probe with respect to the workpiece is displaced along the axis.

13. The information processing device according to claim 1, wherein the measurement device includes a fixing stand, and
wherein the probe is attached to the fixing stand such that a longitudinal direction of the probe has a relationship with the fixing stand where the longitudinal direction of the probe is parallel to a y-axis direction of the fixing stand, orthogonal to an x-axis direction, and orthogonal to a z-axis direction of the fixing stand.

14. The information processing device according to claim 1, wherein the positional relationship includes a distance measured between the measurement device and the workpiece.

15. The information processing device according to claim 1, wherein the display control unit simultaneously displays the measurement information and the state information.

16. The information processing device according to claim 1, further comprising a position control unit configured to control the machine tool in a manner that a relative position of the measurement device with respect to the workpiece is displaced along an axis extending in a direction perpendicular to a longitudinal direction of the probe,
wherein the display control unit provides control to display an amount of change in the distance measured while control is being performed to displace the relative position of the measurement device with respect to the workpiece.

17. The information processing device according to claim 1, further comprising a position control unit configured to control a position of the machine tool and the measurement device,
wherein the display unit dynamically updates the measurement information and the state information based on an operation of the position control unit.

18. The information processing device according to claim 1, wherein the state information includes an operating time of the machine tool.

19. The information processing device according to claim 1, further comprising:
an arithmetic unit configured to calculate an inclination of the workpiece based on the positional relationship of the measurement device with respect to the workpiece as measured at a first relative position and a second relative position,
an inclination compensation unit configured to control the machine tool so as to change the inclination of the workpiece calculated by the arithmetic unit.

20. An information processing device that is connected to a measurement device and a numerical control device, the measurement device being provided in a vicinity of a machine tool configured to machine a workpiece using a tool, the numerical control device being configured to control the machine tool, the information processing device comprising:
a display unit configured to display information;
a first acquisition unit configured to acquire, from the measurement device, measurement information measured by the measurement device;
a second acquisition unit configured to acquire, from the numerical control device, state information indicating a state of the machine tool; and
a display control unit configured to cause the display unit to display the measurement information and the state information,
wherein:
the measurement device includes a probe configured to measure a distance between the probe and the workpiece; and
the display control unit causes the distance and a position of the probe to be displayed,
the information processing device further comprising:
a position control unit configured to control the machine tool in a manner that a relative position of the probe with respect to the workpiece is displaced along an axis extending in a direction perpendicular to a longitudinal direction of the probe,
wherein the display control unit provides control to display an amount of change in the distance measured while control is being performed to displace the relative position of the probe with respect to the workpiece.

* * * * *